US012126961B2

(12) United States Patent
Meng

(10) Patent No.: US 12,126,961 B2
(45) Date of Patent: Oct. 22, 2024

(54) VIBRATION TRANSDUCER

(71) Applicant: AAC ACOUSTIC TECHNOLOGIES (SHENZHEN) CO., LTD., Shenzhen (CN)

(72) Inventor: Zhenkui Meng, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 195 days.

(21) Appl. No.: 18/073,452

(22) Filed: Dec. 1, 2022

(65) Prior Publication Data

US 2024/0073627 A1 Feb. 29, 2024

Related U.S. Application Data

(63) Continuation of application No. PCT/CN2022/114686, filed on Aug. 25, 2022.

(51) Int. Cl.

*H04R 19/04* (2006.01)
*H04R 1/04* (2006.01)
*H04R 1/46* (2006.01)
*H04R 19/00* (2006.01)

(52) U.S. Cl.

CPC ............... *H04R 19/04* (2013.01); *H04R 1/04* (2013.01); *H04R 1/46* (2013.01); *H04R 19/005* (2013.01); *H04R 2201/003* (2013.01); *H04R 2410/03* (2013.01)

(58) Field of Classification Search

CPC . H04R 1/04; H04R 1/46; H04R 1/283; H04R 19/005; H04R 19/02; H04R 19/04; H04R 2201/003; H04R 2410/03
See application file for complete search history.

(56) References Cited

U.S. PATENT DOCUMENTS 11,895,452 B2 * 2/2024 Meng ........................ H04R 1/04
2010/0142743 A1 * 6/2010 Tanaka ..................... H04R 1/38 381/361
2022/0377480 A1 * 11/2022 Hong ................... H04R 31/006

* cited by examiner

*Primary Examiner* — Huyen D Le
(74) *Attorney, Agent, or Firm* — W&G Law Group

(57) ABSTRACT

The present disclosure discloses a vibration transducer including a circuit board enclosing a receiving cavity, a MEMS chip, a first vibration unit having a first vibration cavity and a second vibration unit having a second vibration cavity. A first through hole provided on the circuit board is configured to connect the receiving cavity with the first vibration cavity; a second through hole provided on the circuit board is configured to connect the receiving cavity with the second vibration cavity. The first vibration unit vibrates to cause pressure change in the first vibration cavity which is transmitted to the MEMS chip through the first through hole; the second vibration unit vibrates to cause pressure change in the second vibration cavity which is transmitted to the MEMS chip through the second through hole. The vibration transducer in the present disclosure has higher sensitivity and SNR.

9 Claims, 2 Drawing Sheets

100

100

VIBRATION TRANSDUCER

FIELD OF THE PRESENT DISCLOSURE

The present disclosure relates to sound-electric conversion technologies, especially relates to a vibration transducer applied in bone conduction electronic products.

DESCRIPTION OF RELATED ART

Unlike traditional microphone that collects sound signal through air conduction, a vibration transducer converts vibration signal to electrical signal. With the development of consumer electronic products, vibration transducer becomes more and more widely used.

In related art, the vibration transducer includes a vibration unit served as vibration sensing device and a MEMS microphone served as vibration detection device configured to convert vibration signal to electrical signal. However, the existing vibration sensing device is only provided on one side of the vibration detection device, which limit the detection sensitivity of the vibration transducer and affects the SNR (signal-noise ratio) negatively.

Therefore, it is necessary to provide an improved vibration transducer to overcome the problems mentioned above.

SUMMARY OF THE INVENTION

One object of the present disclosure is to provide a vibration transducer with higher sensitivity and higher SNR.

The vibration transducer includes a circuit board enclosing a receiving cavity; a first vibration unit having a first vibration cavity and fixed to one side of the circuit board, including: a first diaphragm space apart from the circuit board; and a first mass fixed to the first diaphragm; a second vibration unit having a second vibration cavity and fixed to the other side of the circuit board, including: a second diaphragm space apart from the circuit board; and a second mass fixed to the second diaphragm; a MEMS chip received in the receiving cavity and electrically connected with the circuit board; and an ASIC chip received in the receiving cavity and electrically connected with the MEMS chip; wherein a first through hole and a second through hole are provided on the circuit board; the first through hole is configured to connecting the receiving cavity with the first vibration cavity; the second through hole is configured to connecting the receiving cavity with the second vibration cavity; the first vibration unit vibrates to cause pressure change in the first vibration cavity which is transmitted to the MEMS chip through the first through hole; the second vibration unit vibrates to cause pressure change in the second vibration cavity which is transmitted to the MEMS chip through the second through hole.

As an improvement, the circuit board includes a first circuit board, a second circuit board spaced apart from the first circuit board, and a third circuit board connecting the first circuit board with the second circuit board; the first circuit board, the second circuit board, and the third circuit board enclose the receiving cavity; the first through hole penetrates the first circuit board; the second through hole penetrates the second circuit board.

As an improvement, the first vibration unit further includes a first metal ring fixed to the first circuit board, the first diaphragm is fixed to an end of the first metal ring away from the first circuit board; the first diaphragm, the first metal ring, and the first circuit board enclose the first vibration cavity; the first mass is received in the first vibration cavity and is spaced apart from the first circuit board along its vibration direction.

As an improvement, the second vibration unit further includes a second metal ring fixed to the second circuit board, the second diaphragm is fixed to an end of the second metal ring away from the second circuit board; the second diaphragm, the second metal ring, and the second circuit board enclose the second vibration cavity; the second mass is fixed to a side of the second diaphragm away from the second circuit board.

As an improvement, the second vibration unit further includes a fourth circuit board fixed to a side of the second diaphragm away from the second circuit board; the second diaphragm and the fourth circuit board encloses a third vibration cavity; the second mass is received in the third vibration cavity.

As an improvement, the MEMS chip is mounted on the second circuit board; the MEMS chip includes a substrate having a back cavity and mounted on the second circuit board, a membrane fixed to the substrate, and a back plate spaced apart from the membrane; the substrate covers the second through hole; the second through hole is configured to connect the back cavity with the second vibration cavity.

As an improvement, the back plate is fixed to a side of the membrane away from the back cavity; a plurality of sound holes is provided on the back plate.

As an improvement, the ASIC chip is mounted on the second circuit board.

As an improvement, a projection area of the first diaphragm along its vibration direction is equal to a projection area of the second diaphragm along its vibration direction.

BRIEF DESCRIPTION OF THE DRAWINGS

The present disclosure will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
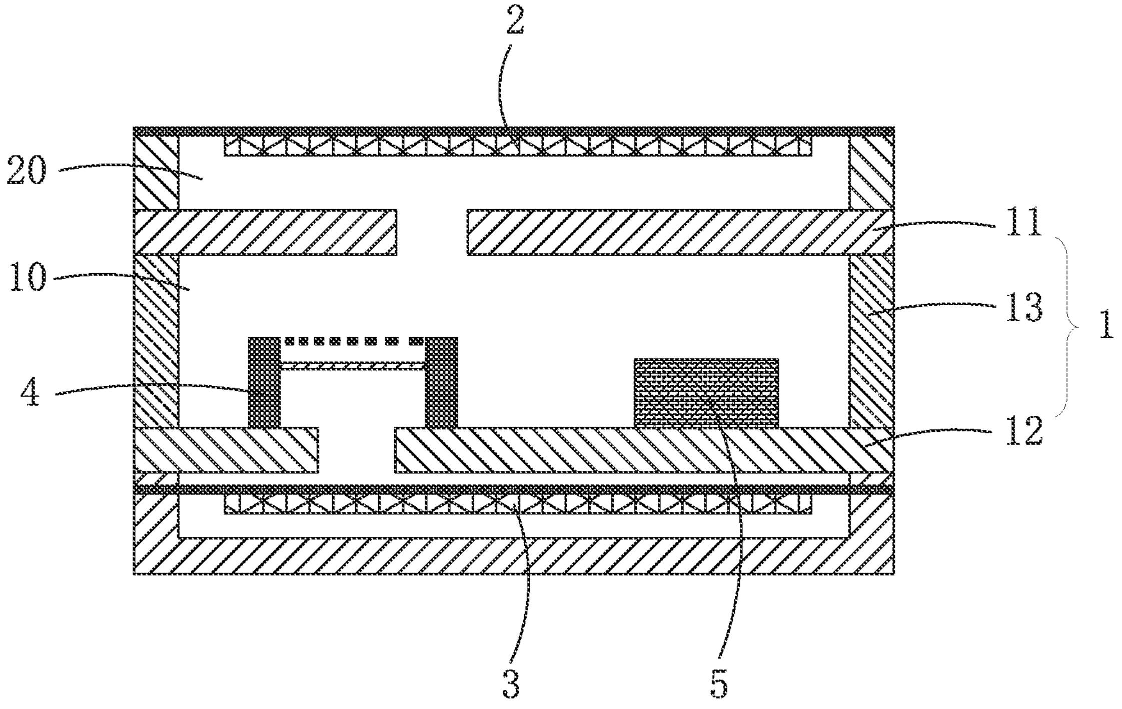
FIG. 1 is a schematic of a vibration transducer in accordance with an exemplary embodiment of the present disclosure.
Figure 2:
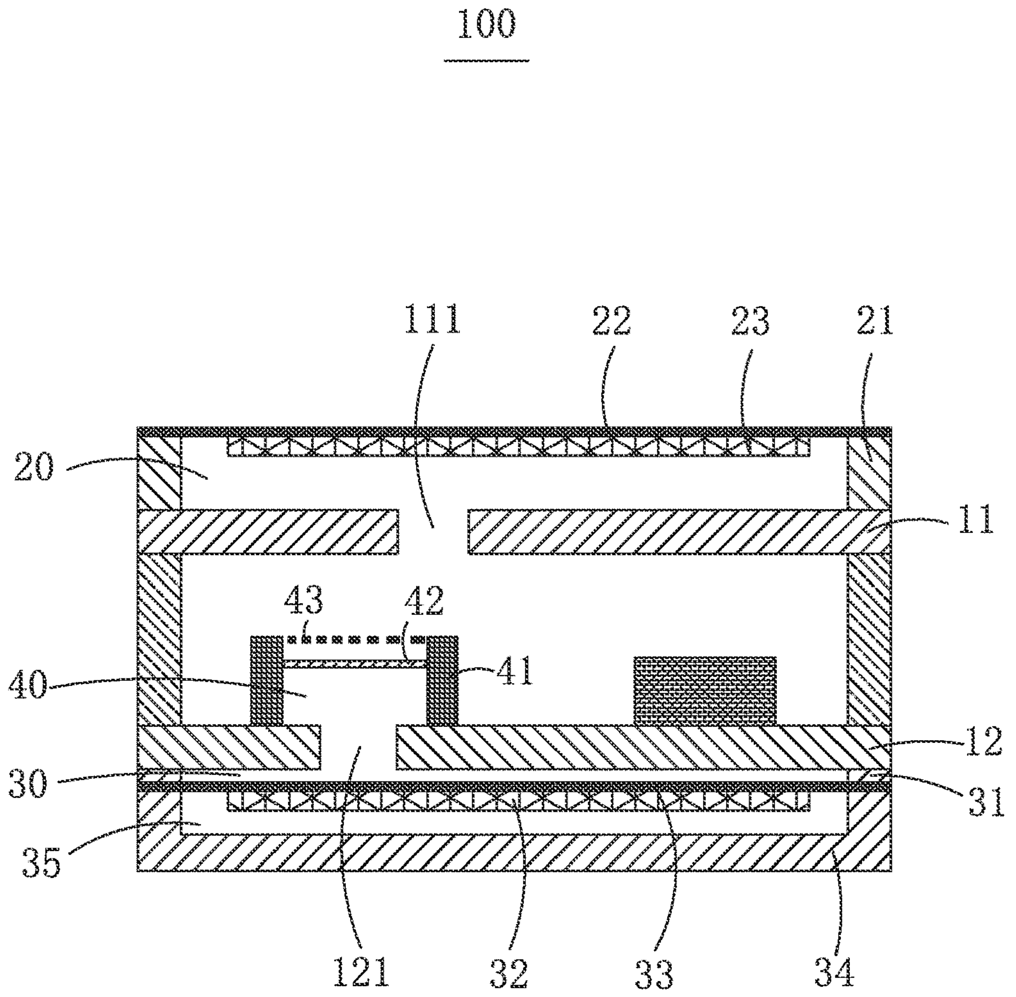
FIG. 2 is a schematic of a vibration transducer in accordance with an exemplary embodiment of the present disclosure.

Please refer to FIGS. 1-2 together, a vibration transducer 100 provided by an exemplary embodiment of the present disclosure includes a circuit board 1 enclosing a receiving cavity 10, a first vibration unit 2, a second vibration unit 3, a MEMS (micro-electromechanical system) chip 4, and an ASIC (application specific integrated circuit) chip 5. The MEMS chip 4 and the ASIC chip 5 are both received in the receiving cavity 10. The first vibration unit 2 and the second vibration unit 3 are arranged on two opposite sides of the circuit board 1, respectively.

The circuit board 1 includes a first circuit board 11, a second circuit board 12 spaced apart from the first circuit board 11, and a third circuit board 13 connecting the first circuit board 11 with the second circuit board 12. The first circuit board 11, the second circuit board 12, and the third circuit board 13 enclose the receiving cavity 10.

The first vibration unit 2 includes a first metal ring 21 fixed to the first circuit board 11, a first diaphragm 22 fixed to an end of the first metal ring 21 away from the first circuit board 11, and a first mass 23 fixed to the first diaphragm 22; the first diaphragm 22 is spaced apart from the circuit board 11. The first diaphragm 22, the first metal ring 21, and the first circuit board 11 enclose the first vibration cavity 20. The first diaphragm 22 vibrates in the first vibration cavity 20 when it senses vibration outside. It can be understood that the first mass 23 is received in the first vibration cavity 20 and spaced apart from the first circuit board 11 along a vibration direction of the first diaphragm 22.

The second vibration unit 3 further includes a second metal ring 31 fixed to the second circuit board 12, a second diaphragm 32 fixed to an end of the second metal ring 31 away from the second circuit board 12, and a second mass 33 fixed to the second diaphragm 32; the second diaphragm 32 is spaced apart from the second circuit board 12. The second diaphragm 32, the second metal ring 31, and the second circuit board 12 enclose the second vibration cavity 30. The second diaphragm 32 vibrates in the second vibration cavity 30 when it senses vibration outside. It can be understood that the second mass 33 is received in the second vibration cavity 30 and spaced apart from the second circuit board 12 along a vibration direction of the second diaphragm 32. In one embodiment, the second mass is fixed to a side of the second diaphragm 32 away from the second circuit board 12.

In one embodiment, the MEMS chip 4 and the ASIC chip 5 are both mounted on the second circuit board 12. The MEMS chip 4 is electrically connected with the second circuit board 12; the ASIC chip 5 is electrically connected with the MEMS chip 4.

Specifically, a first through hole 111 is provided on the first circuit board 11 penetrating thereon; the first through hole 111 is configured to connecting the receiving cavity 10 with the first vibration cavity 20. A second through hole 121 is provided on the second circuit board 12 penetrating thereon; the second through hole 121 is configured to connecting the receiving cavity 10 with the second vibration cavity 30. The first diaphragm 22 of the first vibration unit 2 vibrates to cause pressure change in the first vibration cavity 20 which is transmitted to the MEMS chip 4 through the first through hole 111. Thus, the MEMS chip 4 detects the vibration signal transferred by the first vibration unit 2. Similarly, the second diaphragm 32 of the second vibration unit 3 vibrates to cause pressure change in the second vibration cavity 30 which is transmitted to the MEMS chip 4 through the second through hole 121. Thus, the MEMS chip 4 detects the vibration signal transferred by the second vibration unit 30.

In particular, the MEMS chip 4 includes a substrate 41 having a back cavity 40 and mounted on the second circuit board 12, a membrane 42 fixed to the substrate 41, and a back plate 43 spaced apart from the membrane 42. In order to enable the MEMS chip 4 to sense the pressure change transferred by the second through hole 121, the substrate 41 covers the second through hole 121. In such manner, the back cavity 40 connects with the second vibration cavity 30 through the second through hole 121. In one embodiment, the back plate 43 is fixed to a side of the membrane 42 away from the back cavity 40. A plurality of sound holes 431 is provided on the back plate 43. Thus, the pressure change transferred by the first through hole 111 can be transfer to the membrane 42 of the MEMS chip 4 through the sound holes 431.

Furthermore, the second vibration unit 3 includes a fourth circuit board 34 fixed to a side of the second diaphragm 32 away from the second circuit board 12; the second diaphragm 32 and the fourth circuit board 43 enclose a third vibration cavity 35; the second mass 33 is received in the third vibration cavity 35.

In one embodiment, a projection area of the first diaphragm 22 along its vibration direction is equal to a projection area of the second diaphragm 32 along its vibration direction.

Compared with the related art, the vibration transducer of the present disclosure includes circuit board enclosing a receiving cavity; a MEMS chip and an ASIC chip are received in the receiving cavity; a first vibration unit having a first vibration cavity and a second vibration unit having a second vibration cavity are arranged on two opposite sides of the circuit board. A first through hole provided on the circuit board is configured to connect the receiving cavity with the first vibration cavity; a second through hole provided on the circuit board is configured to connect the receiving cavity with the second vibration cavity. The first vibration unit vibrates to cause pressure change in the first vibration cavity which is transmitted to the MEMS chip through the first through hole; the second vibration unit vibrates to cause pressure change in the second vibration cavity which is transmitted to the MEMS chip through the second through hole. In this manner, the vibration signals generated by the first vibration unit and the second vibration unit can be simultaneously detected by the MEMS chip and then converted to electrical signal, thus effectively improving the sensitivity and SNR of the vibration transducer.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A vibration transducer comprising:

a circuit board enclosing a receiving cavity;

a first vibration unit having a first vibration cavity and fixed to one side of the circuit board, comprising:

a first diaphragm space apart from the circuit board; and a first mass fixed to the first diaphragm;

a second vibration unit having a second vibration cavity and fixed to the other side of the circuit board, comprising:

a second diaphragm space apart from the circuit board; and a second mass fixed to the second diaphragm;

a MEMS chip received in the receiving cavity and electrically connected with the circuit board; and an ASIC chip received in the receiving cavity and electrically connected with the MEMS chip; wherein a first through hole and a second through hole are provided on the circuit board; the first through hole is configured to connecting the receiving cavity with the first vibration cavity; the second through hole is configured to connecting the receiving cavity with the second vibration cavity;

the first vibration unit vibrates to cause pressure change in the first vibration cavity which is transmitted to the MEMS chip through the first through hole;

the second vibration unit vibrates to cause pressure change in the second vibration cavity which is transmitted to the MEMS chip through the second through hole.

2. The vibration transducer as described in claim 1, wherein the circuit board comprises a first circuit board, a second circuit board spaced apart from the first circuit board, and a third circuit board connecting the first circuit board with the second circuit board; the first circuit board, the second circuit board, and the third circuit board enclose the receiving cavity; the first through hole penetrates the first circuit board; the second through hole penetrates the second circuit board.

3. The vibration transducer as described in claim 2, wherein the first vibration unit further comprises a first metal ring fixed to the first circuit board, the first diaphragm is fixed to an end of the first metal ring away from the first circuit board; the first diaphragm, the first metal ring, and the first circuit board enclose the first vibration cavity; the first mass is received in the first vibration cavity and is spaced apart from the first circuit board along its vibration direction.

4. The vibration transducer as described in claim 2, wherein the second vibration unit further comprises a second metal ring fixed to the second circuit board, the second diaphragm is fixed to an end of the second metal ring away from the second circuit board; the second diaphragm, the second metal ring, and the second circuit board enclose the second vibration cavity; the second mass is fixed to a side of the second diaphragm away from the second circuit board.

5. The vibration transducer as described in claim 4, wherein the second vibration unit further comprises a fourth circuit board fixed to a side of the second diaphragm away from the second circuit board; the second diaphragm and the fourth circuit board enclose a third vibration cavity; the second mass is received in the third vibration cavity.

6. The vibration transducer as described in claim 2, wherein the MEMS chip is mounted on the second circuit board; the MEMS chip comprises a substrate having a back cavity and mounted on the second circuit board, a membrane fixed to the substrate, and a back plate spaced apart from the membrane; the substrate covers the second through hole; the second through hole is configured to connect the back cavity with the second vibration cavity.

7. The vibration transducer as described in claim 6, wherein the back plate is fixed to a side of the membrane away from the back cavity; a plurality of sound holes is provided on the back plate.

8. The vibration transducer as described in claim 6, wherein the ASIC chip is mounted on the second circuit board.

9. The vibration transducer as described in claim 1, wherein a projection area of the first diaphragm along its vibration direction is equal to a projection area of the second diaphragm along its vibration direction.

* * * * *